United States Patent [19]
Doerr

[11] Patent Number: 5,575,107
[45] Date of Patent: Nov. 19, 1996

[54] PERFECT PLANTING COLOR CODE, AND METHODS OF CONSTRUCTING AND UTILIZING SAME

[76] Inventor: Gary R. Doerr, 2087 Forest Dr., Lapeer, Mich. 48446

[21] Appl. No.: 627,343

[22] Filed: Dec. 14, 1990

[51] Int. Cl.$^6$ .................................................. A01B 79/00
[52] U.S. Cl. ................................ 47/1.01; 47/58; 40/645; 206/423
[58] Field of Search ............................... 47/1.01, 66, 72, 47/39; 206/232, 423, 459; 40/645

[56] References Cited

U.S. PATENT DOCUMENTS

| | | | |
|---|---|---|---|
| 2,052,030 | 8/1936 | Holzer | 40/645 |
| 2,181,977 | 12/1939 | Magovern | 40/645 |
| 2,294,567 | 9/1942 | Mooney | 40/645 |
| 2,664,670 | 1/1953 | Mulford | 47/72 |
| 2,799,953 | 7/1957 | Sage | 40/645 |
| 3,057,093 | 10/1962 | Gallo | 47/47 R |
| 3,737,093 | 6/1973 | Amberg et al. | 206/459 |
| 3,840,113 | 10/1974 | Bartleson | 206/232 |
| 3,910,412 | 10/1975 | Vargo | 206/459 |
| 4,126,417 | 11/1978 | Edwards | 47/1.01 |
| 4,256,225 | 3/1981 | Jackson | 206/459 |
| 4,297,811 | 11/1981 | Weder | 47/72 |
| 4,731,943 | 3/1988 | Schlicter | 40/645 |
| 4,972,616 | 11/1990 | Doll | 40/645 |
| 5,044,220 | 9/1991 | Dailley | 40/645 |

FOREIGN PATENT DOCUMENTS

| | | | |
|---|---|---|---|
| 1454512 | 10/1966 | France | 40/645 |
| 334928 | 2/1959 | Switzerland | 40/645 |

OTHER PUBLICATIONS

American Nurseryman; Apr. 15, 1990 pp. 5, 67–72 Article Titled "A Perennial Philosophy" by Gary Doerr.

Primary Examiner—Henry E. Raduazo
Attorney, Agent, or Firm—Weiner, Carrier & Burt, P.C.; Joseph P. Carrier; Irving M. Weiner

[57] ABSTRACT

A kit of components for a display adapted to aid the novice or inexperienced gardener in the proper selection, care and placement of perennial plants. The kit includes color-coded charts, planting guides and plant containers to visually highlight the various growing requirements for the variety of plants.

17 Claims, 7 Drawing Sheets

PERFECT PLANTING COLOR CODE, AND METHODS OF CONSTRUCTING AND UTILIZING SAME

BACKGROUND OF THE INVENTION

1. Field of the Invention

The present invention relates to a kit of components adapted to aid the novice or inexperienced gardener in the proper care and placement of perennial plants, such as certain types of flowers. More particularly, the present invention includes color-coded charts, planting guides and plant containers to visually highlight for the customers the optimal growing conditions for each species of perennial plants. The present invention also provides the customer with guidance in identifying and locating various types of perennial plants.

2. Description of the Relevant Art

Prior to the present invention, new products, improved varieties and chemical regulations have increased pressure on retailers to provide accurate information for a myriad of products. It was found that even the most highly trained retail staff lacked sufficient knowledge to properly inform the customers about the purchase of perennial plants. Unfamiliarity with the use of perennial plants for maximum landscape benefit, coupled with confusion over the size, pricing and characteristics of a particular plant, leaving retailers and customers with many unanswered questions.

It was difficult for the consumer to envision the plant before him/her in full bloom and fully grown in the desired location. Also, inexperienced gardeners are not fully aware of the cultivation requirements for each plant, such as the proper amount of light, amount of water, fertilizing, etc.

The present invention provides a helpful display guide and a color-coded planting guide for providing the consumer with the necessary information for the care and placement of the plant.

SUMMARY OF THE INVENTION

The present invention provides an interactive display means with easy visual identification of varieties of plants and planting requirements for the particular plant.

In a preferred embodiment, the display means includes a kit of components having color-coded containers, improved labeling and attractive signs, the labels and signs including an explanation of the significance of the color-coded containers the color-coding signifying the amount of sunlight the plant in that container requires for optimum growing conditions.

The labels and signs include further planting and growing information including a picture of the plant in bloom to permit the purchaser to see the color and size of the full grown plant.

It is an object of the present invention to provide a display means which addresses the end purchaser's needs and interacts with the end purchaser.

It is a further object to provide a kit of components to achieve the goal set forth above.

Another object of the present invention is to provide color-coded containers as an aid in planting the plant held in the container.

Another object of the present invention is to provide improved labeling and attractive signs.

The above and further objects, details and advantages of the invention will become apparent from the following detailed description, when read in conjunction with the accompanying drawings.

DETAILED DESCRIPTION OF THE PREFERRED EMBODIMENTS

Figure 1:
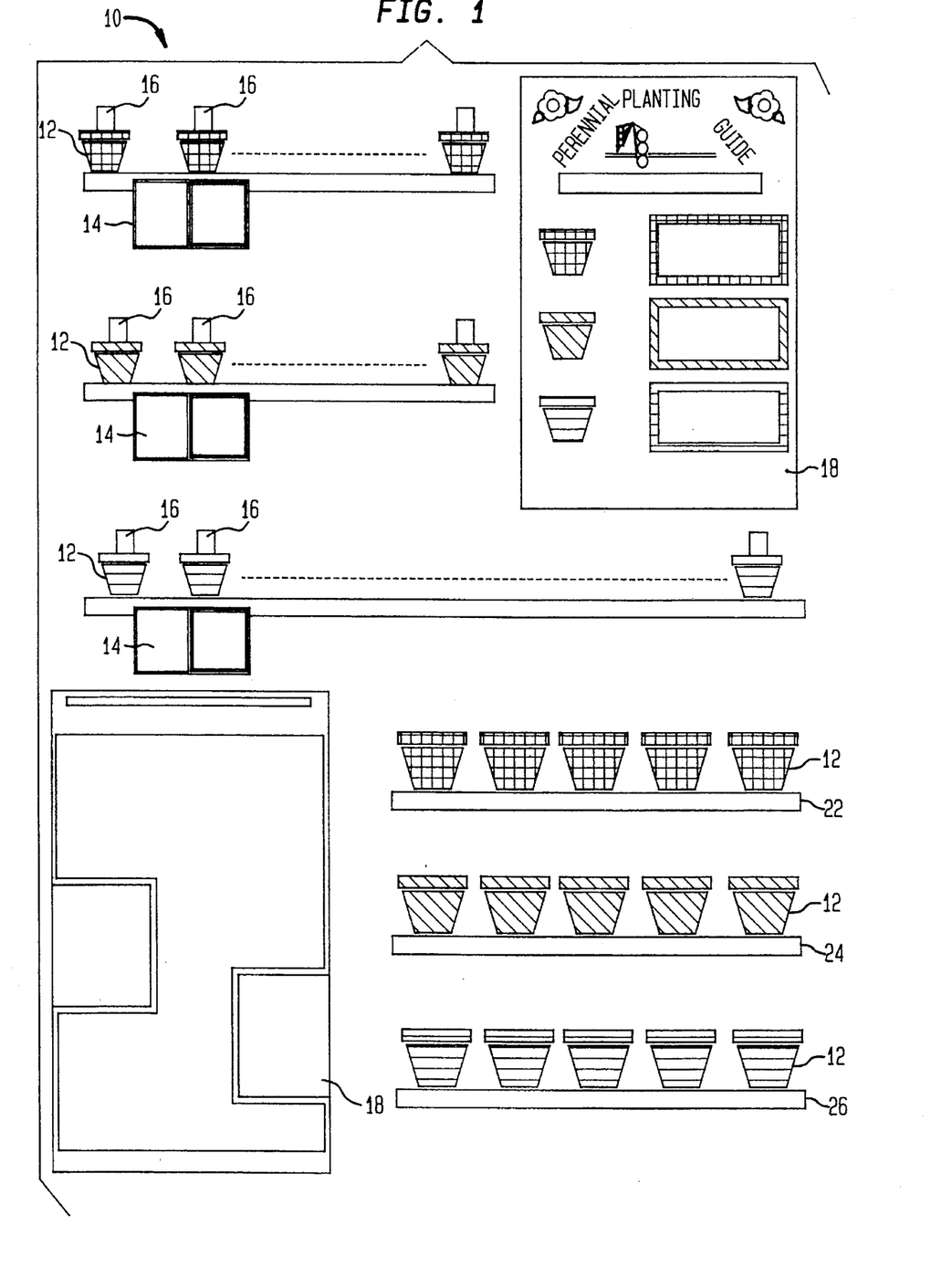
FIG. 1 illustrates the kit of components which make up the display means in accordance with the present invention.

Referring now to the drawings, FIG. 1 illustrates a display 10 utilizing the kit of components in accordance with the present invention. The kit of components includes color-coded containers 12, labels 14 (known as "Perfect Planting" picture cards), tags 16, signs 18 and instruction sheets 20 (best seen in FIG. 6).

Generally, display 10 will include a series of shelves that include plants in containers 12 which are alphabetically arranged by the plant name for ease of inventory and customer selection.

In addition, the display 10 preferably includes three tiers (22, 24, 26) to reinforce the three colors provided by the color-coding system to be described below. Optionally, the display is divided into three areas, one area for each color, each area being a separate stand, cart or kiosk.

Figure 2A:
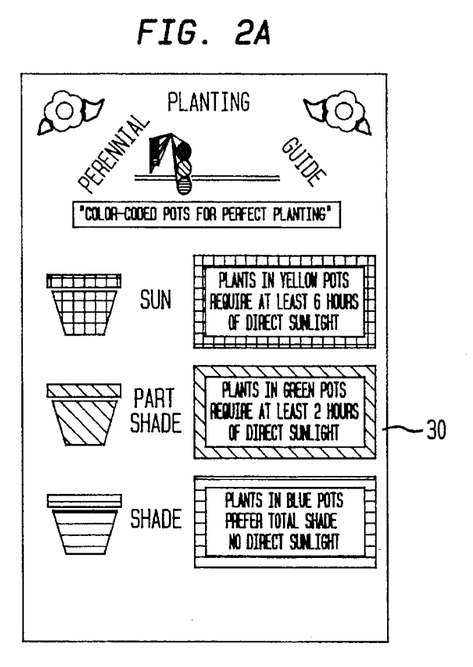
FIG. 2A illustrates a first sign included in the kit of components in accordance with the present invention.
Figure 2B:
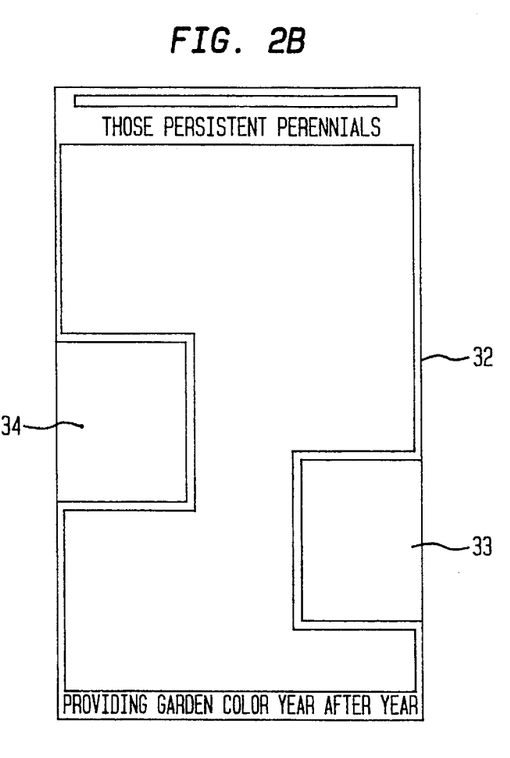
FIG. 2B illustrates a second sign included in the kit of components in accordance with the present invention.

Referring now to FIGS. 2A and 2B, a first sign 30 explains the color-coding system utilized to aid in plant selection and planting. A second sign 32 illustrates the various plants (not shown) available in the display 10 in full bloom and full size to aid the customer in visualizing the plant in his/her garden or other selected location. Insets 33, 34 would show additional plants (not shown) available to the customer.

As shown in FIG. 2A, the color-coding system consists of providing a plant which requires extended periods of direct sunlight in a yellow container. All tags 16 and labels or picture cards 14 would also include this color-coding (yellow) feature for these types of plants. The plants which requires some sunlight (approximately 2 hours) are provided in a green container. All labels or picture cards 14 and tags 16 would correspondingly include the green color-coding. The plants which requires or prefers total shade (no direct sunlight) are provided in blue containers. Again, all labels 14 and tags 16 would be respectively color-coded.

Figure 5A:
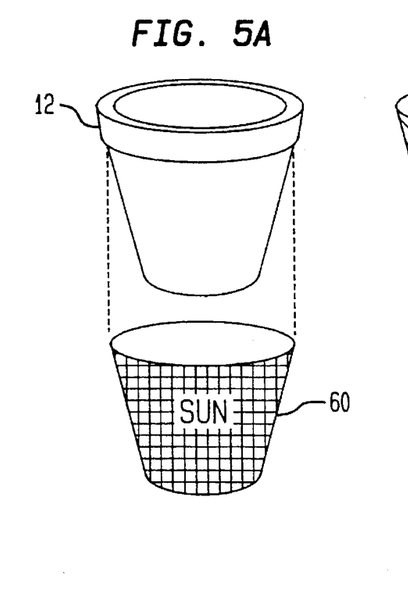
FIGS. 5A, 5B and 5C illustrates a container color-coded means in accordance with the present invention.
Figure 5B:
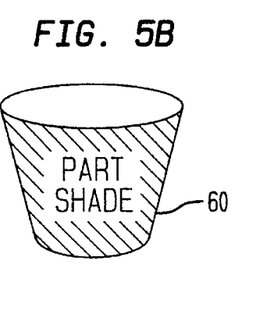
Figure 5C:
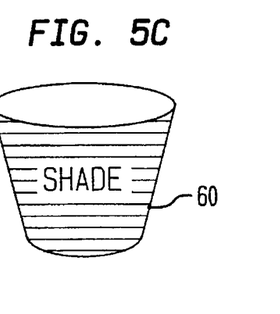

A seen in FIGS. 5A, 5B and 5C, the containers 12 are preferably color-coded utilizing an indicating means comprising a veneer 60 provided in the appropriate colors. Preferably, the veneer 60 is secured by an adhesive means (not shown). In addition, the indicating means for container 12 may be painted on the container in the appropriate color or molded into a plastic container. The veneer 60 permits the container 12 to be marked according to the area of the country the plant may be shipped to. As shown, each of the veneers 60 is a single solid color with a partial explanation of the color-coding printed thereon, i.e., "SUN", "PART SHADE", "SHADE".

Figure 3A:
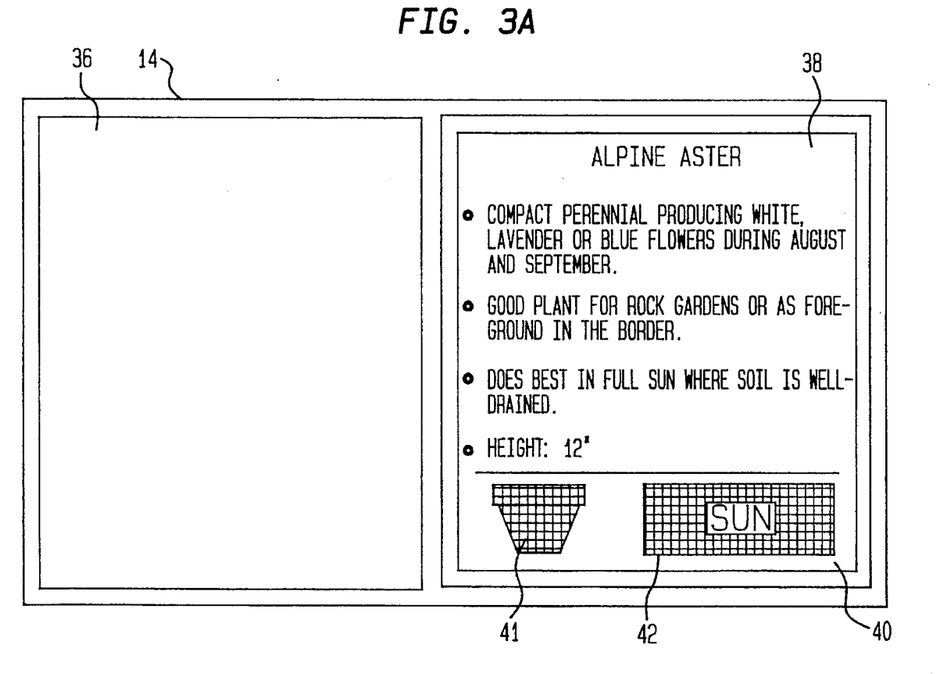
FIG. 3A illustrates a first embodiment of a label included in the kit of components in accordance with the present invention.

Referring now to FIG. 3A, a first embodiment of a "Perfect Planting" picture cards, a label or a planting guide 14 includes a picture area 36, cultural information area 38 and color-coding information area 40. Picture area 36 preferably includes a photograph of the fully blooming plant for the customers viewing. Cultural information area 38 includes care and growing tips for the customer and color-coding area 40 includes a color-coded container 41 and color-coded bar 42 including the appropriate wording (i.e., sun, partial shade, or shade). The labels 14 may be provided in other shapes, such as in the shape of a flower pot (not shown).

Figure 3B:
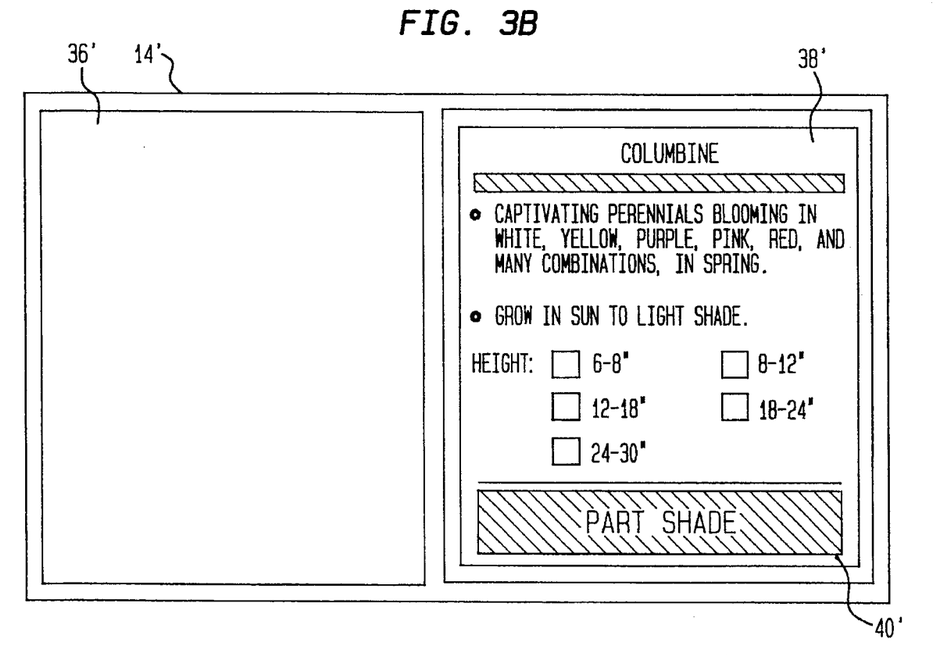
FIGS. 3B and 3C illustrates a second embodiment of labels included in the kit of components in accordance with the present invention.
Figure 3C:
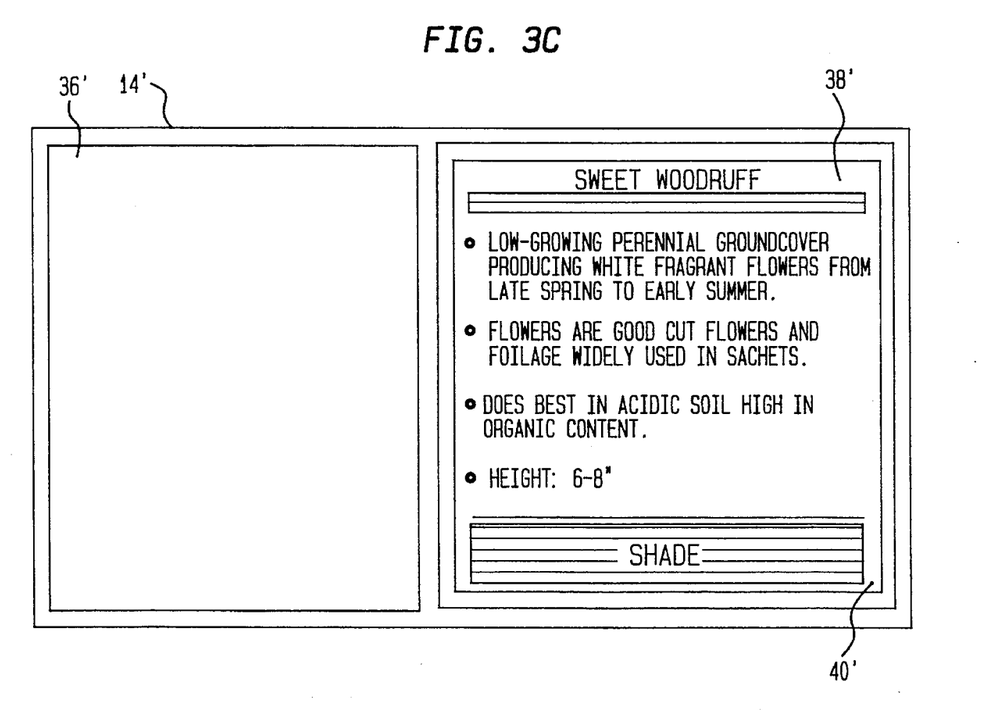

A second embodiment of the label is shown, in FIGS. 3B and 3C. This label 14 includes corresponding areas 36' 38' and 40'. Label 14' differs in the arrangement of the information provided in areas 38' and 40'. A solid color-coded bar is included in color-coding information area 40' with the appropriate wording.

FIGS. 4A, 4B, 4C and 4D illustrate four embodiments of tags 16 which are inserted into the soil or growing medium held in container 12 or attached to container 12. Each tag 16, 16', 16" includes an area for depicting a plant or a picture area 44, color-coding area 46 and a name and color-coding area 48 at the upper, substantially square end. The area below color-coding area 46 may include important cultural information as shown by block 49 in FIG. 44. Each tag 16, 16', 16" includes a ground insertion end 50 which is pointed to ease insertion of the tag.

Figure 4A:
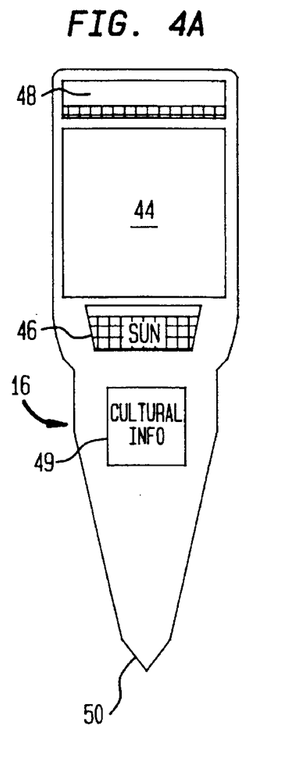
FIG. 4A illustrates a first embodiment of a tag included in the kit of components in accordance with the present invention.
Figure 4B:
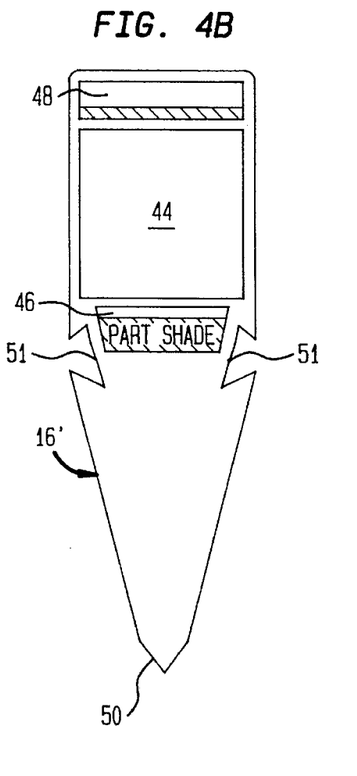
FIG. 4B illustrates a second embodiment of a tag included in the kit of components in accordance with the present invention.
Figure 4C:
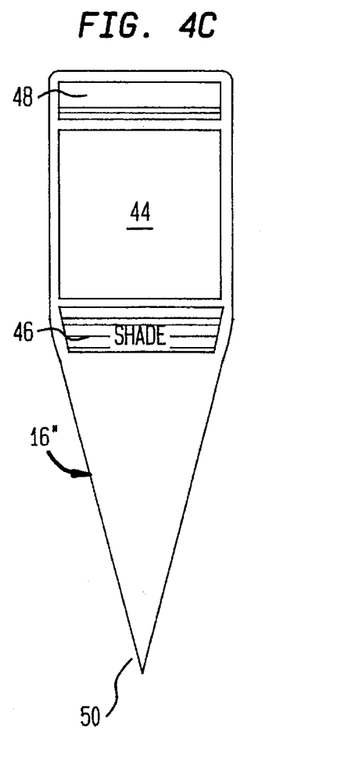
FIG. 4C illustrates a third embodiment of a tag included in the kit components in accordance with the present invention.

Tag 16' shown in FIG. 4B also includes locking means 51 comprising a pair of indentations adapted to secure the tag 16' into a slot provided in the upper edge of some plant containers. The indentations may be provided at any location along the length of the tag 16''' depending upon the amount of information provided thereon. The locking means 51 prevents the tag 16' from being moved to another container by unauthorized people and prevents confusion as to the type of plant in the container 12. The tags 16, 16', 16", like the veneers, 60 preferably include a printed particle explanation of the color-coding in the area 46.

Figure 4D:
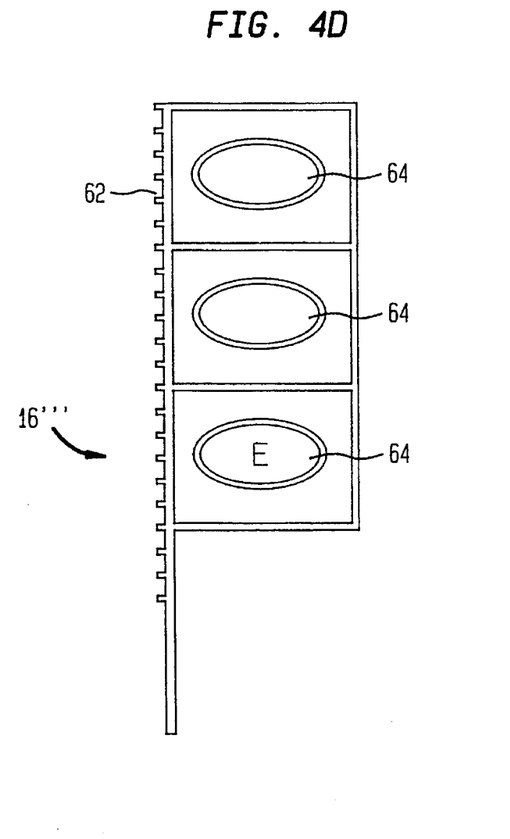
FIG. 4D illustrates a fourth embodiment of a tag included in the kit of components in accordance with the present invention.

Tag 16''' shown in FIG. 4D is adapted to provide a variety of information to the consumer. A first side 62 depicts increments of distance (such as inches) and each oval 64 represents a general height along the side 62. According to the type of plant, an oval 64 would be color-coded to indicate the appropriate lighting conditions for growth. This same oval would include an indicia to indicate early season bloom (E), mid-season bloom (M) or late-season bloom (L) plants. The oval including the indicia would also indicate the general height potential of the plant. For example, the plant indicated by FIG. 4D would be a low-growing, early blooming variety.

Figure 6:
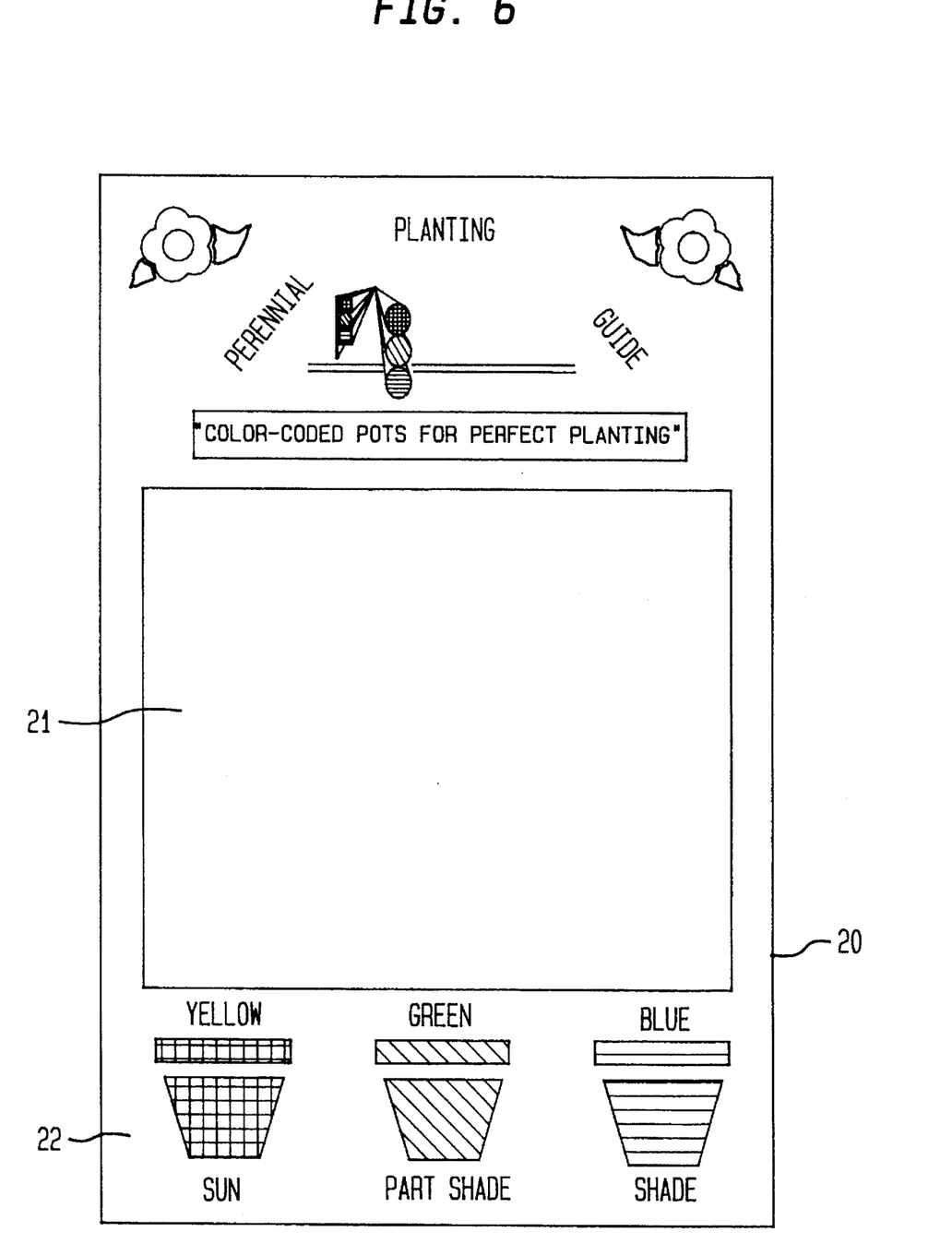
FIG. 6 illustrates a general instruction sheet included in the kit of components in accordance with the present invention.

FIG. 6 illustrates a general instruction sheet 20 including an area for instructions 21 which may include an explanation of the color-coded display means 10. The color-coded containers are shown in area 22.

Preferably, wherever a picture of the plant is shown on a tag label or sign, the plant is shown in bloom and representative size to help the customer to visualize the plant in the desired location. Thus, the present invention permits the customer to easily identify appropriate locations for each plant with respect to the height, spread, bloom time, texture and color of the particular plant.

The kit of the present invention also permits flexibility with respect to different regions of the country. For example, a plant which may do well in full sun in Michigan may not do well in full sun in Florida. Thus, the proper color coding of the container that plant is in will ensure the growth of the plant when purchased and planted by the consumer.

Although there has been described what is at present considered to be preferred embodiments of the invention, it will be understood that various modifications and variations may be made therein, and it is intended to cover in the appended claims, all such modifications as fall within the true spirit and scope of the invention.

I claim:

1. A kit of components for a display for potted plants, comprising:

indicating means for the containers the potted plants are held in, the indicating means comprising color coded, solid-colored sleeves adapted to be bonded to said containers corresponding to the amount of light needed by the plant held in one of said containers, said sleeves being provided in at least three different colors;

a first color sleeve indicates a plant which requires at least six hours of direct sunlight, a second color sleeve indicates a plant which requires at least two hours of direct sunlight, and a third color sleeve indicates a plant which prefers total shade;

tags for said containers, said tags being color-coded in said at least three different colors;

planting label guides adapted to be secured adjacent a plurality of said containers holding a same variety of plant, said planting label guides being color-coded in said at least three different colors; and poster charts adapted to be secured prominently in said display and including an explanation of said color-coding.

2. A kit according to claim 1, wherein:

said tags or said sleeves include a partial explanation of said color-coding.

3. The kit of components according to claim 1, wherein:

said tags are adapted to be secured in a growing medium of said potted plants in said containers; and each of said tags including an area for depicting a variety of plant held in said container when the variety of plant is mature.

4. The kit of components according to claim 3, wherein:

each of said planting, label guides includes an information area including cultivation information and a picture area showing a same variety of plants;

said tags include locking means for securely engaging an edge of said container when said tags are also secured in said growing medium, said locking means including an indentation formed along an edge of each said tag.

5. The kit of components according to claim 4, wherein:

said poster charts include a first chart including said interpretation of said color-coding; and a second chart depicting several varieties of plants in bloom together for demonstrating the visual compatibility thereof.

6. A kit of components for a display for potted plants, comprising:

indicating means for pots the potted plants are held in, the indicating means comprising color-coded, solid colored sleeves adapted to be bonded to said pots corresponding to the amount of light needed by the plant held in each of said pots, said sleeves being provided in at least three different colors;

a first color sleeve indicates a plant which requires at least six hours of direct sunlight, a second color sleeve indicates a plant which requires at least two hours of direct sunlight, and a third color sleeve indicates a plant which prefers total shade;

tags for said pots, said tags being color-coded in said at least three different colors;

planting label guides adapted to be secured adjacent a plurality of said pots holding a same variety of plant, said planting label guides being color-coded in said at least three different colors;

poster charts adapted to be secured prominently in said display and including an explanation of said color-coding; and each of said tags is flag-shaped and includes means for indicating the potential growth height of the plant when the tag is secured in said growing medium, said height indicating means comprising a plurality of height indicating projections formed along an edge of each tag.

7. A kit according to claim 5, wherein said second chart includes a primary area depicting a first variety of potted plants in bloom and a plurality of inset areas respectively showing other varieties of plants in bloom.

8. A method for the display of potted plants, comprising the steps of:

providing a kit of components including indicating means for pots potted plants are held in, tags for the pots, planting label guides, and poster charts;

said indicating means comprising color-coded, solid colored sleeves provided in at least three different colors, a first color sleeve indicating a plant which requires at least six hours of direct sunlight, a second color sleeve indicating a plant which requires at least two hours of direct sunlight, and a third color sleeve indicating a plant which prefers total shade;

color-coding said pots with respect to the amount of direct sunlight needed by each particular plant by bonding one said color-coded sleeve on an outer surface of the pot of said each particular plant;

providing a plurality of color-coded tags having colors corresponding to said color-coded, solid colored sleeves and securing one said tag in a growing medium of each particular plant;

color-coding said planting label guides in said at least three different colors, and securing each said planting label guide adjacent a plurality of said pots holding a same variety of potted plant; and providing an interpretation of said color-coding on at least one of said poster charts, and securing said poster charts in prominent positions in said display.

9. A method of claim 8, including a step of providing at least three levels of said display, said levels corresponding to said at least three different colors of said color-coding, respectively;

said potted plants in each said level are alphabetically arranged according to the plants' names; and said colored sleeves are adhesively secured to said pots.

10. A method according to claim 8, wherein each of said tags includes locking means for securely engaging an edge of a corresponding pot when said tag is also secured in a growing medium of the potted plant, said locking means including an indentation formed in a vertical edge of each said tag, and said method includes a further step of securing said tags to said pots when said tags are secured in said growing medium.

11. A method according to claim 8, wherein each of said tags is flag-shaped and includes means for indicating potential growth height of the plant when the tag is secured in a growing medium of the potted plant, said height indicating means comprising a plurality of projections formed along a vertical edge of each said tag, and said method includes a step of securing said flag-shaped tags in the growing medium of said potted plants to indicate potential growth height of the plants.

12. A method according to claim 8, wherein:

said tags or said sleeves are provided with a partial explanation of said color-coding.

13. A kit of components for a display for visually highlighting varieties of potted plants and optimum growing requirements for the potted plants, the kit comprising:

indicating means for color-coding containers holding the potted plants with respect to the amount of light required by plants held in said containers:

said indicating means comprising solid-colored veneers provided in at least three different colors, said different colors indicating different amounts of light required by the potted plants in the containers;

tags for said containers, said tags having locking means for connecting with said containers when said tags are also secured in a growing medium of said potted plants for preventing unauthorized removal of said tags from said containers, said tags being color coded in said at least three different colors, and each said tag including an area for depicting a particular variety of plant at maturity and an area presenting cultural information of said variety of plant;

planting label guides adapted to be secured adjacent a plurality of containers holding a same variety of said potted plants, said planting label guides being color coded in said at least three different colors; and poster charts adapted to be secured prominently in said display and at least one of said poster charts including an interpretation of said color-coding.

14. The kit of components of claim 13, wherein:

a first color veneer indicates plants which require at least six hours of sunlight;

a second color veneer indicates plants which require at least two hours of sunlight; and a third color veneer indicates plants which prefer total shade.

15. The kit of components of claim 13, wherein:

each of said tags is flag-shaped including means for indicating the potential growth height of a particular type of plant when the tag is secured in said growing medium, said height indicating means including a plurality of projections formed along a vertical edge of each said tag.

16. The kit of components of claim 15, wherein:

said cultural information includes information which signifies if the plant is early blooming, mid-season blooming or late season blooming.

17. A kit according to claim 13, wherein:

said tags or said veneers include a partial explanation of said color-coding.

* * * * *